United States Patent [19]

MacDoran

[11] Patent Number: 4,463,357

[45] Date of Patent: Jul. 31, 1984

[54] METHOD AND APPARATUS FOR CALIBRATING THE IONOSPHERE AND APPLICATION TO SURVEILLANCE OF GEOPHYSICAL EVENTS

[75] Inventor: Peter F. MacDoran, Pasadena, Calif.

[73] Assignee: The United States of America as represented by the Administrator of the National Aeronautics and Space Administration, Washington, D.C.

[21] Appl. No.: 322,317

[22] Filed: Nov. 17, 1981

[51] Int. Cl.³ .............................................. G01S 3/02
[52] U.S. Cl. ................................... 343/460; 343/352; 343/5 W
[58] Field of Search ............. 343/5 W, 460, 378, 357, 343/422, 352

[56] References Cited

U.S. PATENT DOCUMENTS

| | | | |
|---|---|---|---|
| 3,727,225 | 4/1973 | Adrian | 343/460 |
| 3,881,154 | 4/1975 | Lewis et al. | 343/5 W |
| 3,987,445 | 10/1976 | Fales | 455/304 |

OTHER PUBLICATIONS

Koehler, Radio Propagation Measurements of Pulsed Plasma Streams from the Sun Using Pioneer Spacecraft, J. Geophysical Research, Space Physics, vol. 73, No. 15, Aug. 1, 1968, pp. 4883–4894.

Primary Examiner—Theodore M. Blum
Attorney, Agent, or Firm—Paul F. McCaul; Thomas H. Jones; John R. Manning

[57] ABSTRACT

The columnar electron content of the ionosphere between a spacecraft (10) and a receiver (12, 14) is measured in realtime by cross correlating two coherently modulated signals transmitted at different frequencies ($L_1$, $L_2$) from the spacecraft to the receiver using a cross correlator (16). The time difference of arrival of the modulated signals is proportional to electron content of the ionosphere. A variable delay (21) is adjusted relative to a fixed delay (20) in the respective channels ($L_1$, $L_2$) to produce a maximum at the cross correlator output. The difference in delay required to produce this maximum is a measure of the columnar electron content of the ionosphere. A plurality of monitoring stations (31, 32, 33) and spacecrafts (GPS satellites 34, 35, 36) are employed to locate any terrestrial event that produces an ionospheric disturbance.

7 Claims, 4 Drawing Figures

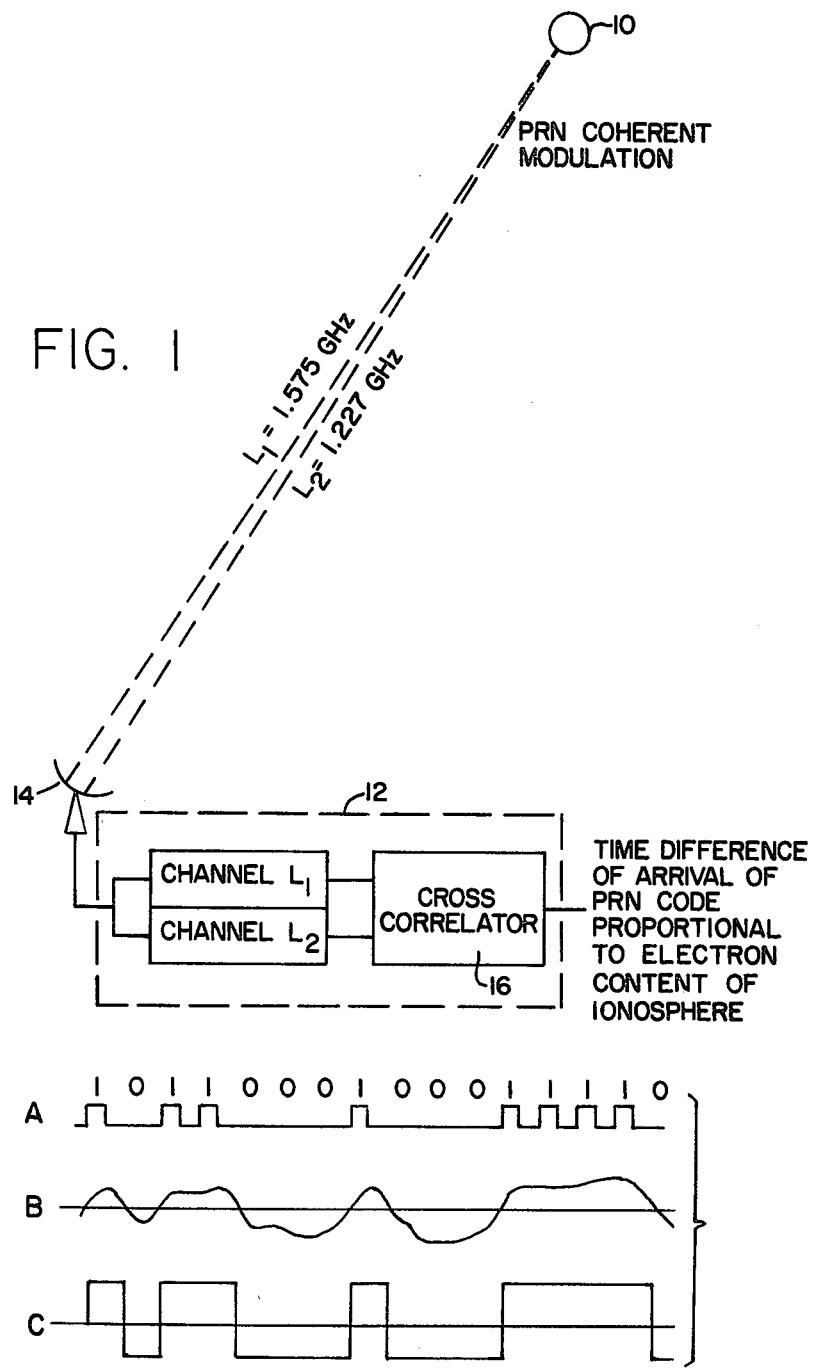

METHOD AND APPARATUS FOR CALIBRATING THE IONOSPHERE AND APPLICATION TO SURVEILLANCE OF GEOPHYSICAL EVENTS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a technique for calibrating the ionosphere in respect to columnar electron content on a realtime universally applicable basis, and to application of that calibrating technique to surveillance of large-scale geophysical events which modify the ionosphere.

The ionosphere has been extensively explored in nonrealtime. The earliest technique involved the Ionosonde utilizing a pulsed transmitter that sends radio signals vertically upward while slowly sweeping the radio frequency.

Pulses reflected by the ionosphere are received and recorded; the elapsed time between pulsed transmission and reception can be interpreted as an apparent distance to the point of reflection. This sounds only the bottom side of the ionosphere. The resulting presentation is a curve of apparent height vs. frequency. This technique is still profitably and extensively used today. In recent years, many rockets have flown *through* the ionosphere to record data, and satellites have orbited above the ionosphere for similar purposes. An ionosonde in a satellite has been utilized to explore the topside of the ionosphere (that portion above the region of maximum electron concentration).

The Ionosonde technique applied at ground stations showed that the ionosphere is structured. It was first thought that discrete layers were involved, commonly referred to as D, E, $F_1$, $F_2$. However, rocket measurements have shown that the "layers" merge with one another to such an extent that they are now normally referred to as regions. A vertically incident radio wave is reflected from the ionosphere at that level where natural frequency of the plasma equals the radio frequency. This procedure makes it possible to identify the electron concentration at the point of reflection in terms of the radio frequency according to the relation $$n_e = 1.24 \times 10^{10} f^2 \qquad (1)$$

where $n_e$ is the electron concentration per cubic meter and f is the radio frequency in megahertz.

The D region is the lowest ionospheric region extending approximately from 60 to 85 kilometers. The D region is susceptible to disturbance particularly due to x-ray bursts. The sudden ionospheric disturbances (SID's) occur over the daylight hemisphere with some solar flares; it can be shown that SID's also occur because of acoustic pressure, atomic blasts (including underground), volcanic eruptions, earthquakes which cause acoustic percussion, and large tropospheric storms.

VHF Faraday rotation has been used to estimate the charged particle count of the ionosphere, but this Faraday effect depends upon Earth's magnetic field and no measurable effect exists for electrons out of the magnetic field influence. Therefore, this technique cannot inherently measure the total electron content without modeling associated parameters.

A surprisingly large number of applications for accurate ionospheric measurements exist. The ionosphere represents a significant error source for high precision radio metric tracking data. For example, $1 \times 10^{17}$ el/m² zenith columnar content during night hours results in 12 cm of baseline length increase on an Astronomical Radio Interferometric Earth Surveying (ARIES) geodetic measurement at S-band on a 336 km distance. Spacecraft tracking at S-band and to a lesser degree at X-band by a factor of 13, also suffers from errors caused by free electrons in the radio path which are substantially the Earth's ionosphere. The time variable ionospheric electron columnar content in the tracking station to spacecraft line of sight causes variations which are highly correlated with the Doppler effects caused by changes in spacecraft right ascension and declination positions.

Less prosaic applications also exist because of the effect of troposphere to ionosphere dynamic coupling. Disturbances in the troposphere propagate into the ionosphere and can cause propagating ionospheric waves. Speculations exist concerning impulsive input in the troposphere which has manifestation in the ionosphere. For example, a tsunami event in the ocean causes an acoustic impulses which propagates into the ionosphere. The March 1980 Mount St. Helens eruption was very clearly evident in VHF Faraday rotation ionospheric monitoring at Goldstone, Calif. That Faraday rotation instrumentation has a sensitivity of approximately $3 \times 10^{15}$ el/m² on 1 minute samples and an ambiguity of $4 \times 10^{16}$ el/m². Other impulsive events of interest are nuclear explosions, especially underground explosions in which seismic hiding methods might be employed to confuse seismic detection of such events. If conducted underground, the explosive impulse could be transmitted to the surface and result in a tropospheric impulse which may be detectable as an ionospheric columnar electron content modification.

More direct influences in the ionosphere will also be detectable such as particle interactions, principally solar induced, but perhaps the result of ionospheric heating by input electromagnetic energy or disturbances caused by hot gases expelled by missiles during their boost phase or perhaps the testing of particle beam weapons.

Large scale weather systems in the troposphere and stratosphere probably also effect ionospheric patterns providing yet another opportunity to study global meteorological processes. Combining these ionospheric observations with the direct range and Doppler measurements from high precision geodetic receivers will yield small scale variations along the line of sight which are caused by tropospheric index of refraction changes. The water vapor and dry tropospheric components are responsible for these index changes which can be detected with millimeter path equivalent sensitivity once ionospheric effects have been removed.

It is thus evident that if the ionosphere is continually calibrated, any sudden change in the ionosphere will signal a terrestrial event within seconds. It is important to detect some events in realtime, such as a tsunami event in order to alert those in the path of these destructive sea waves, or the launching of an intercontinental missile in order to launch an intercepting missile. Other events, such as an underground atomic explosion of an experimental nature may not be as critical, but the ability to detect it in realtime would still be important.

The problem then is one of providing a technique for continual calibration of the ionosphere in realtime on at least a regional scale, but preferably on a global scale. This capability has not heretofore been available. Since the localized ionosphere is modified by terrestrial events because of troposphere acoustic coupling and direct atomic interaction, such as is due to hot gases expelled from missiles in their boost phase or plasma clouds in front of ballistic reentry vehicles or particle-beam impingng on the ionosphere, a plurality of ionosphere surveillance stations could then be clustered about any strategic area to provide passive continuous monitoring of that area for military applications as well as civil, commercial and geodetic applications while being compatible with existing active and passive local surveillance systems.

SUMMARY OF THE INVENTION

In accordance with the invention, the columnar electron content of the ionosphere between a spacecraft and a receiver at a ground station is measured in realtime by cross correlating two coherently modulated signals transmitted at different frequencies from the spacecraft to the receiver. Both frequencies are coherently modulated by noise, or pseudo random noise (PRN) by the transmitter. A delay in the transmission of one frequency signal relative to the other is a measure of the integrated ion concentration of the ionosphere. Any large and sudden change in the ion concentration could indicate a large-scale terrestrial event. By monitoring any changes in the delay in transmission of one frequency signal versus the other from a plurality of spacecraft relative to a plurality of receivers, the approximate location of a terrestrial event causing a perturbed region of the ionosphere can be determined from the raypath directions of the receivers from the spacecraft transmitters. The present invention thus provides a means for continuously monitoring the ionosphere at a plurality of stations which continuously measure the columnar electron content of the ionosphere such that the location of any sudden ionospheric disturbance occurring between stations can be determined in realtime, constituting a global surveillance system.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a schematic diagram illustrating the technique for calibrating the ionosphere in accordance with this invention.

FIG. 2 illustrates in waveforms A, B and C a PRN code for modulation on a carrier, the carrier modulated by the PRN code, and the PRN code detected from the carrier, respectively.

DESCRIPTION OF PREFERRED EMBODIMENTS

Referring to FIG. 1 of the drawings, the ionosphere calibration system exploits the fact that a Global Positioning System (GPS) satellite 10 simultaneously broadcasts two L-band channels, $L_1$ at 1.575 GHz and $L_2$ at 1.227 GHz, with a 20 MHz bandwidth pseudorandum noise (PRN) coherently modulated on both channels. These two PRN modulations are emitted in phase coincidence, but the $L_2$ channel modulation will be delayed by the ionosphere a greater amount than the 1.575 GHz modulation according to a frequency squared relationship. The time difference of arrival of the $L_2$ modulation relative to the $L_1$ modulation is directly proportional to the total columnar electron content along the observer-to-satellite path. It is precisely this dual $L_1$ and $L_2$ dispersion relationship which was explicitly designed into the GPS for range calibration from its inception. However, GPS user calibrations depend upon having a decoder for the received $L_1$ and $L_2$ PRN sequences in order to correct the $L_1$ pseudo range measurement for typical GPS applications. Where only an ionospheric measurement is desired, it is unnecessary to explicitly know the PRN sequence. All that is needed is exploitation of the fact that the same sequence arrives on the $L_2$ channel as arrived first on the $L_1$ channel, and to use cross correlation of $L_1$ and $L_2$ to determine this time difference. In this manner, full use is made of the 20 MHz bandwidth transmissions without knowledge of the details of the PRN sequence. Information about the PRN codes is generally unavailable and the GPS codes may even be encrypted.

An antenna 14 directed at the GPS is a conventional dual frequency antenna feeding two channels $L_1$ and $L_2$ in the receiver, where channel $L_1$ is tuned to the frequency 1.575 GHz, and channel $L_2$ is tuned to the frequency 1.227 GHz. FIG. 2 illustrates in waveform A a typical PRN code used to modulate the channels $L_1$ and $L_2$, and waveform B illustrates the nonreturn-to-zero modulation of the PRN code on one of the channels. The receiver amplifies and separates the modulated $L_1$ and $L_2$ signals into two channels which are then converted to digital form for cross correlation (or simply cross correlated in analog form) to determine the delay which must be introduced at the receiver to bring the two signals into coincidence, at which time the output of the cross correlator is maximized, or minimized, depending on the implementation of the cross correlator.

Figure 3:
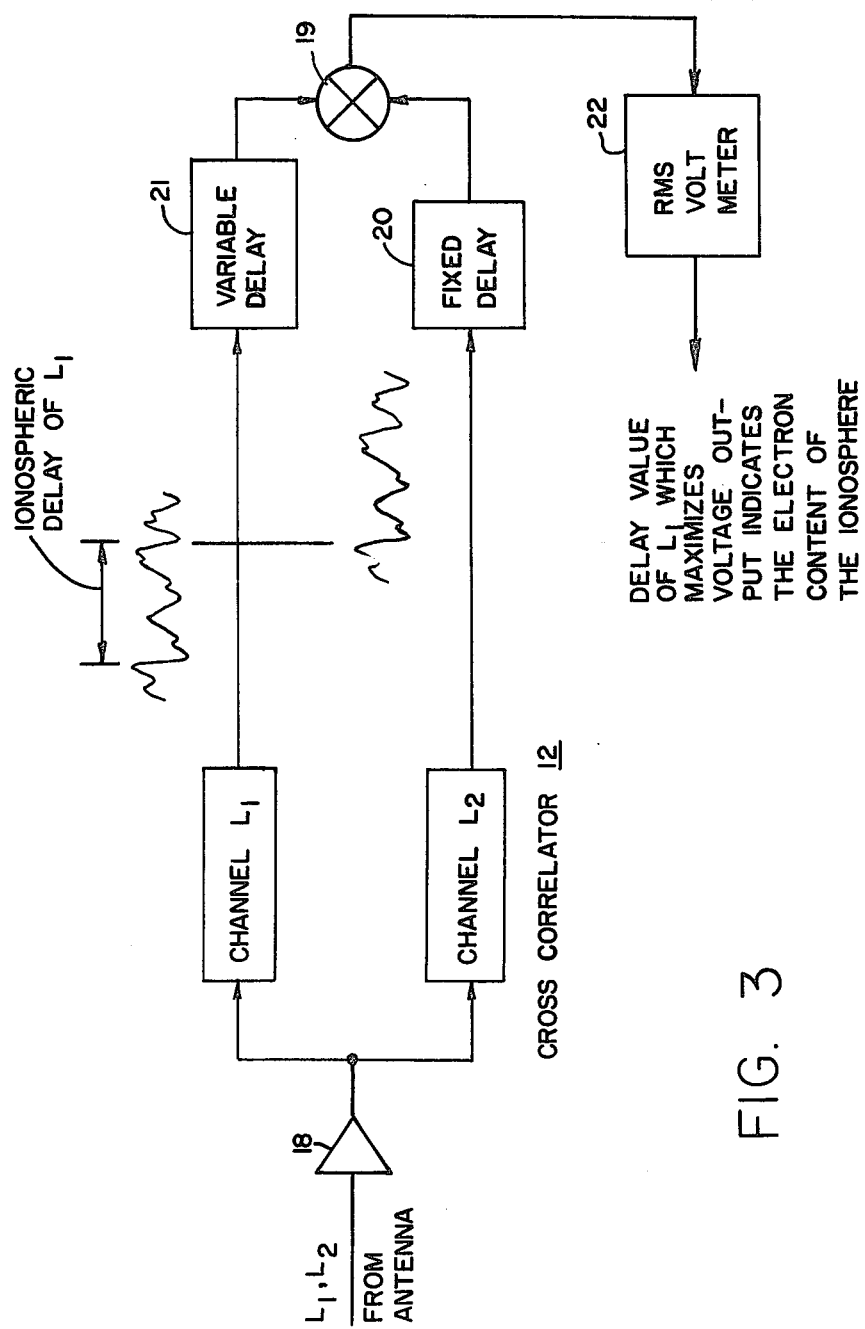
FIG. 3 illustrates an exemplary cross correlator for the technique of FIG. 1.

An analog implementation of the cross correlator is illustrated in FIG. 3. Briefly, an amplifier 18 first amplifies the signals which are then separated into two channels $L_1$ and $L_2$, such as by filters at the inputs of the channels. The signals are converted to baseband in the channels, which is to say the modulations on the separate signals at frequencies $L_1$ and $L_2$ are obtained separately in each channel. The output of the channel $L_2$ is applied to an RF mixer 19 through a fixed delay 20 while the output of the channel $L_1$ is applied to the RF mixer through a variable delay 21. The latter is adjusted for a maximum voltage output from the mixer, as indicated by an RMS voltmeter 22. The difference between the values of the fixed delay and the variable delay is a measure of the columnar electron content between the transmitter and the receiver.

The variable delay may be implemented with a plurality of separate delay lines, each a known increment longer than the other. A switch is then operated to connect each successive one in sequence until a maximum output is produced from the mixer. Programmed digital control of the switch can provide for fast and automatic measurements to monitor the ionosphere continuously without the need for an operator. Alternatively, both the measurement circuits and the control can be implemented with digital circuits.

Preliminary accuracy estimates of this satellite ionospheric calibration technique for L-band are $10^{16}$ electrons per meter squared absolute and perhaps $10^{15}$ el/m$^2$ for differential total electron contents which is the important quantity in radio interferometry data types. For S-band quasar interferometry applications, the station to satellite raypaths can be calibrated to an accuracy of approximately one centimeter with some accuracy degradation encountered in mapping to the quasar directions. At X-band, the calibration accuracy should be path equivalent to the submillimeter level. For applications to GPS geodetic missions, the ionosphere should be calibrated to an accuracy of 5 cm, or better, limited probably by the signal to noise conditions in the cross correlation processing of the 20 MHz bandwidth signals in the $L_1$ and $L_2$ channels.

Conceptually, this same approach can be applied to the tracking of S/X-band downlink equipped spacecraft which require an uplink ranging code. The spacecraft ranging channel is only a frequency translating microwave repeater. Thus, whatever noise is present within the ranging channel bandwidth (i.e., 1.5 MHz baseband) is coherently modulated onto the S and X channels. By tracking the S and X channels, a measurement of the columnar electron content is made without the necessity for ranging in either channel. Several economies are possible with this innovation:

1. Fewer kilowatts of power need be consumed in generating high power S-band Earth to spacecraft transmissions;
2. Longer microwave transmitter tube life in Earth stations through less high power use is possible;
3. Smaller amounts of data need be processed compared to obtaining ranging at S-band to be differenced against ranging at X-band to reveal total electron content in the Earth to spacecraft path.

In addition, during times of solar superior conjunction tracking of spacecraft, the S-band uplink becomes so disturbed that the spacecraft receiver loses phase lock and, as a result, can no longer coherently transpond the ranging code. Use of cross correlation charged particle calibration continues to function in this environment because the spacecraft received S-band ranging channel is only noise, but coherently modulated onto the S/X downlink, and is fully useable in a cross correlation implementation to its full 1.5 MHz bandwidth. Consequently, it should be understood that the present invention is not limited to GPS satellites, although the GPS satellites operating as currently planned with PRN modulation are well suited.

Once all GPS satellites are operational, there will always be at least four in view from any Earth location, each coherently modulated on two L-band carriers. As these two carriers are received from GPS satellites at different ground stations, each using a directional antenna, the difference in time of arrival of the two channels at each antenna is a function of the delay due to the ionosphere, i.e., the electron content of the column of space between the satellite and the ground station. As noted hereinbefore, it is not necessary to decode the PRN sequence; it is sufficient to cross correlate the outputs of the two receiver channels.

An application of this ionosphere calibration technique will now be described with reference to FIG. 3. This application is for global monitoring of events such as missile launchings, atomic explosions, earthquakes, volcanoes, sun-spot activity, and other phenomena which affect the ionosphere or are influenced by the ionosphere. No system presently exists to accurately monitor the ionosphere continuously in realtime especially without detailed GPS code knowledge, though this is potentially a powerful source for early warning and forecasting information for civil, commercial and military purposes. The GPS satellites, already globally available, can be utilized to furnish dual-frequency beacon signals on a broad spatial basis. Other satellites to be added by the mid 1980's can be utilized for higher spatial resolution. When fully implemented, the GPS coverage of the Earth will be complete such that at any location at any time, at least four satellites will be above the local horizon. Thus, four raypaths can be sampled at any arbitrary time.

Figure 4:
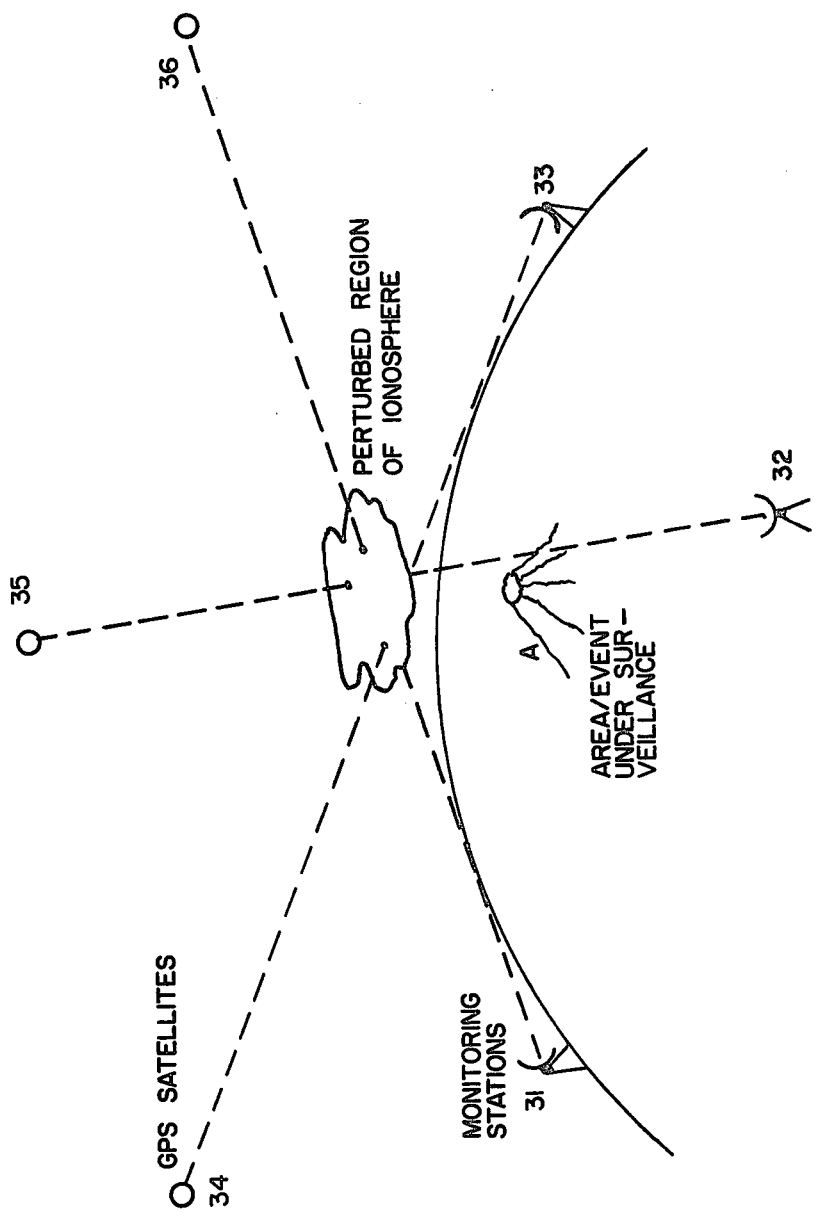
FIG. 4 illustrates an application of the technique for calibrating the ionosphere surveillance of large-scale geophysical events by passive realtime monitoring of the charged particle content of the ionosphere.

FIG. 4 is a schematic diagram illustrating the broad two-dimensional coverage of three ground stations 31, 32 and 33 of an ionosphere radio surveillance system based on a plurality of two-frequency signal beacon sources, such as the L-band GPS satellites 34, 35 and 36. The two-frequency signals are received at the ground stations by dual-channel correlation receiver systems for columnar sampling and monitoring of the ionosphere charged particle content, as described with reference to FIGS. 1 and 2 for one station and one GPS satellite with reference to FIGS. 1 and 2.

Ground stations 31, 32 ad 33 outlying a strategic area A normally monitor the dual-frequency signals emanating from satellites 34, 35 and 36, establishing an average charged particle content along the raypaths through the ionosphere from the satellites to the antennas. A perturbation of the charged particle content of the ionosphere caused by a volcanic eruption or even a missile launching, for example, can then be located in two dimensions from the raypath directions of the antennas. Furthermore, any phenomenon traversing two or more raypaths; i.e., showing a similar but sequential perturbation of the ionosphere, can yield velocity as well as direction of travel of the phenomenon.

It will be appreciated that the ionospheric radio surveillance system is a completely passive system which cannot be detected and which is compatible with all other types of surveillance systems since it depends only on the reception of signals and interpretation of charged particle measurements through the ionosphere. Although the preferred embodiment uses GPS satellites modulated by a PRN code, it is unnecessary for any ground station to explicitly know the PRN code. All that is needed is exploitation of the fact that the same sequence and/or digital transition rate arrives on the $L_2$ channel as first arrived on the $L_1$ channel, and to use cross correlation of $L_1$ and $L_2$ to determine this time differene. In this manner, full use is made of the 20 MHz bandwidth transmissions without knowledge of the PRN sequence.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method of calibrating the electron columnar content in the space between a transmitter on a spacecraft and a receiver on Earth comprising the steps of: transmitting from said transmitter two broadband signals separated in frequency, each coherently modulated by pseudorandom noise; receiving in a direct path from said transmitter both of said signals at a receiver having two channels for obtaining said modulations on said two signals; and cross correlating the modulation of one received signal to the modulation of the other received signal to determine the phase difference between the modulation of said one received signal to the modulation of said other received signal as a measure of electron content in the space between the transmitter and receiver.

2. A method as defined in claim 1 wherein said calibration is carried on continuously in real time to monitor the electron columnar content for any change therein.

3. A method as defined in claim 2 wherein said spacecraft is at a known position relative to the Earth and said receiver is at a known position on Earth and changes in the electron columnar content between the Earth and said spacecraft is indicative of a terrestrial event of significance, including the step of detecting any sudden change in electron columnar content in the known path between said transmitter and said receiver.

4. A method as defined in claim 3 used a plurality of receivers and transmitters, each transmitter on a different spacecraft of known positive relative to the Earth, and each receiver being in a known position on the Earth for monitoring the columnar electron content between receivers and transmitters, each receiver operating the same as all other receivers with signals received from a transmitter, including the step of locating the source of sudden change in the electron content in the space between said plurality of transmitters and receivers in two dimensions from the known paths of the receivers to the transmitters.

5. A method as defined in claim 4 wherein a plurality of spacecraft transmitters are in a position to be in line of sight communication with each receiver at all times.

6. Apparatus for calibrating the electron columnar content between a transmitter in space and a receiver on Earth comprising
means for transmitting from said transmitter two broadband signals separated in frequency, each coherently modulated with pseudorandom noise,
means at said receiver for receiving said transmitted signals along a direct path from said transmitter,
means for cross correlating said modulation of one received signal with the modulation of the other received signal at said receiver, including
means for separating said two received signals into two channels converted to baseband,
means for adjustably delaying the baseband signal in one channel relative to the other,
means for cross correlating said delayed baseband signals, and
means for determining the delay of said first channel signal producing the maximum output of said cross correlating means as a measure of the columnar electron content between said transmitting means and said receiving means.

7. A system for detecting the occurrence of a terrestrial event that disturb the ionosphere by monitoring electron content of the ionosphere using a plurality of stations and spacecrafts at known locations, each station operating the same as all other stations with signals received from a spacecraft, comprising
means at each spacecraft for transmitting two signals at different frequencies coherently modulated with pseudorandom noise,
means at each station for receiving said two signals in a direct path from a spacecraft,
means for converting each of said two signals received to baseband,
means for adjustably delaying one baseband signal relative to the other,
means for cross correlating said two baseband signals as said one is delayed relative to the other to determine the delay of said one relative to the other which produces a maximum cross correlation output as a measure of said electron content, and
means for locating the position of the source causing disturbance of the electron content of the ionosphere from the known position of stations and spacecrafts detecting a disturbance.

* * * * *